I. G. BLACKBURN.
Improvement in Check-Valve Indicators.
No. 130,838.　　　　　　　　　　　Patented Aug. 27, 1872.
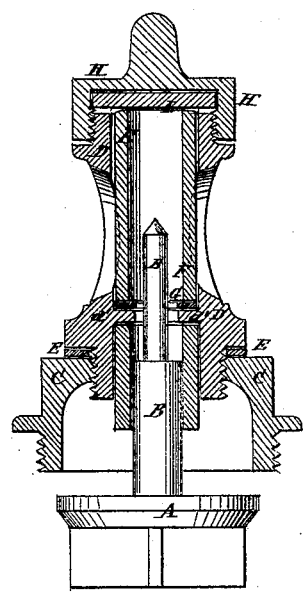

UNITED STATES PATENT OFFICE.

JOSEPH G. BLACKBURN, OF NEW YORK, N. Y., ASSIGNOR TO HIMSELF AND FRANK M. KIMBERLY, OF SAME PLACE.

IMPROVEMENT IN CHECK-VALVE INDICATORS.

Specification forming part of Letters Patent No. 130,838, dated August 27, 1872.

Specification describing a new and useful Improvement in Check-Valve Indicator, invented by JOSEPH G. BLACKBURN, of New York city, in the county and State of New York.

The figure is a detail sectional view of my improved indicator.

My invention has for its object to furnish an improved device for attachment to check-valves to show whether they are working properly, and which shall be simple in construction, and may be applied with the same facility to an old as to a new valve. The invention consists in combining a glass tube, stem, and bonnet with a check-valve, so that the latter can always be seen by the engineer, while the former can be readily detached to obtain access thereto.

In the accompanying drawing, A represents the valve, B the stem, and C the bonnet or cap of a check-valve. D is a metallic tube, the lower end of which is screwed into the bonnet or cap C, the joint being made steam-tight with rubber or other suitable packing, E. In the metallic tube D is placed a short glass tube, F, the lower end of which rests upon an inwardly-projecting flange, d', formed in the lower part of the tube D, a packing, G, being placed upon the flange d' beneath the lower edge of the glass tube F to make the joint steam-tight. The glass tube F is secured in place by a screw-cap, H, screwed upon the upper end of the metallic tube D, a packing, I, being placed upon the upper end of the glass tube F beneath the cap H, so that when the said cap is screwed down to its place both the ends of the glass tube F may be embedded in the packings G I, and may thus be made steam-tight. In the case of new valves the metallic tube D may be cast solid with the bonnet C. The sides of the metallic tube D are cut away to allow the glass tube F to be seen. The valve-stem B is lengthened in the case of old valves by having a piece attached to it, which piece, in the case of new valves, may be formed in one piece with said stem, so that it may project into the glass tube F to be conveniently seen, enabling the engineer to see at a glance whether his valve be working properly. This device is especially applicable to the check-valve of the feed-pump of steam-boilers, steam-heating apparatus, &c.

The application is as follows: The cavities of the metallic tube D allowing a view to the engineer through the glass tube F, the position of the valve can be clearly seen, and any change from its true location or contemplated action readily detected. In the event of any misplacement or derangement of the valve the cap H, tube D, and glass F are quickly removed and the difficulty remedied.

Having thus described my invention, I claim as new and desire to secure by Letters Patent—

An indicator, consisting of the cap H, tube D, and glass tube F, combined with the bonnet of a check-valve, A B C, as and for the purpose described.

JOSEPH G. BLACKBURN.

Witnesses:
JAMES T. GRAHAM,
T. B. MOSHER.